Aug. 18, 1964  E. V. KOOLS  3,145,063
FORAGE BLOWER
Filed March 27, 1962
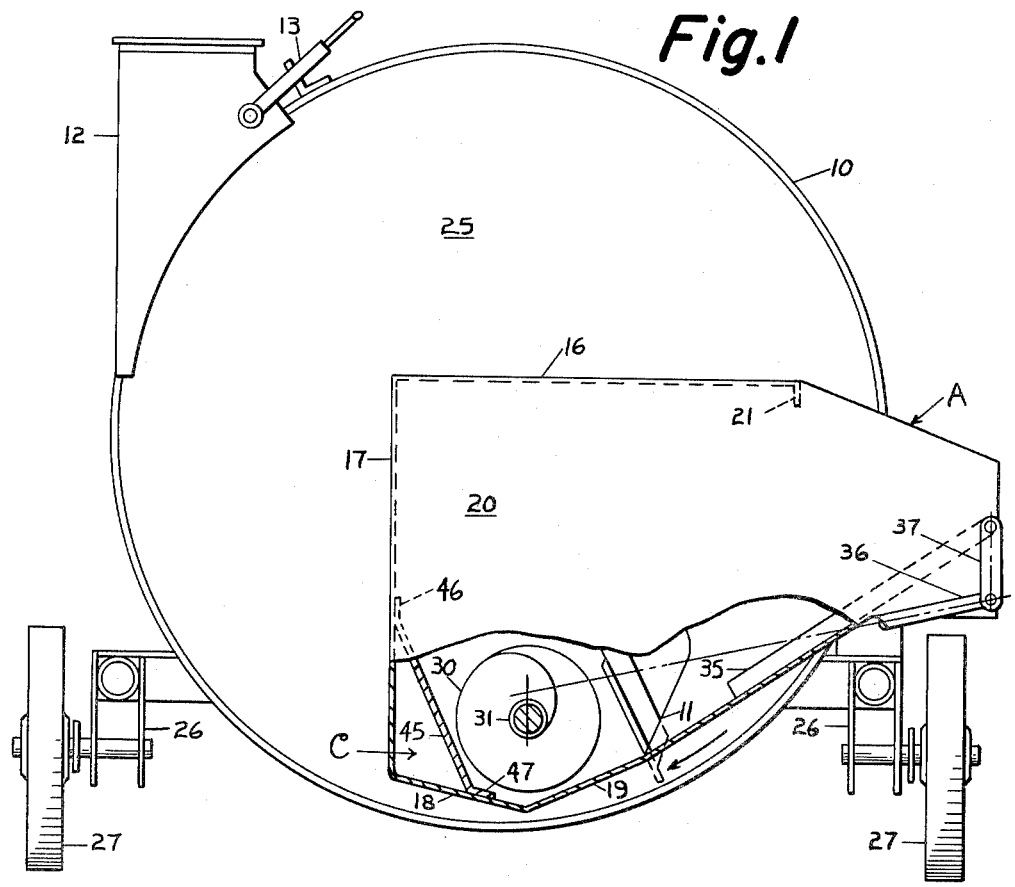
Fig.1
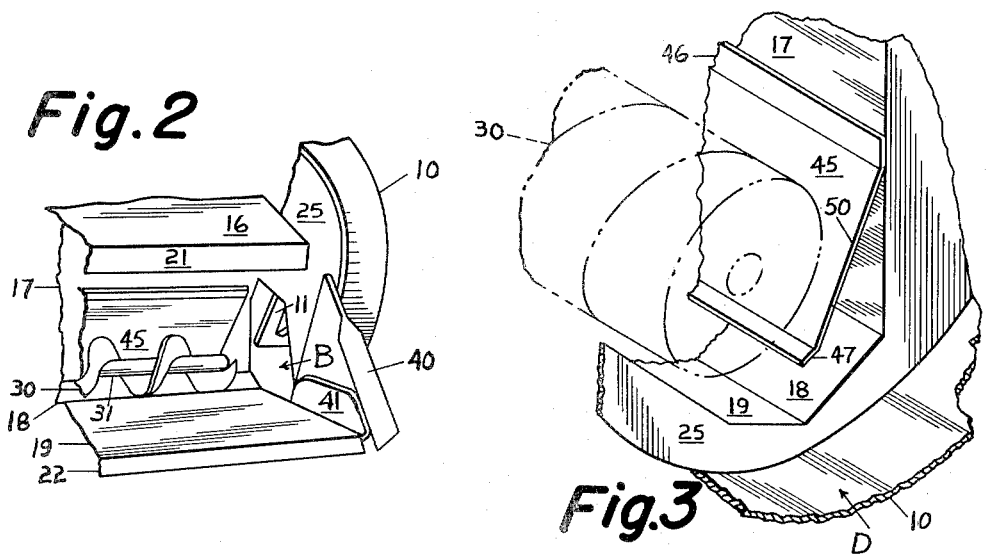
Fig.2
Fig.3

3,145,063
FORAGE BLOWER
Edward V. Kools, Appleton, Wis., assignor to Kools Brothers, Inc., Menasha, Wis., a corporation of Wisconsin
Filed Mar. 27, 1962, Ser. No. 182,825
8 Claims. (Cl. 302—37)

This invention relates to a forage blower, of the type commonly used on farms to blow chopped or other forage into a silo, an elevated storage place such as a haymow, a transport such as a trailer, or the like.

The common forage blower, sometimes having forage cutting means integrally associated therewith, is in widespread use, being used to handle a wide diversity of materials, ranging from dry to wet, particulate to stringy, thick stalked to thin, tough to brittle, etc. Such blowers comprise a housing having an impeller mounted therein for propelling the material to the desired repository, a bin for initially receiving the material, a conveyor for moving the material from the bin into the blower housing, and frequently a second conveying means for carrying the material into the bin. When associated with forage cutting means, the second conveying means carries the forage against a cutter head, which acts in conjunction with a shear bar to cut or chop the forage into finer form, the cut material then dropping into the bin for conveying into the blower housing.

A problem frequently encountered in blower operation is a tendency for the forage to agglomerate or collect in the bin around the conveyer, which usually comprises a driven auger. While this difficulty may be more common when blowing damp and stringy materials, it is in fact not unusual in general operation. When the problem occurs, there results an interference with conveying of the material into the blower housing, thereafter the agglomeration may uncontrollably break up into chunks or "slugs" which impose shock loads on the auger and impeller, and on occasion the agglomeration continues to the point of jamming the auger or impeller sufficiently to impose loads on the mechanism sufficient to result in breakdowns.

It is the purpose of this invention to provide a modified forage blower structure, involving only an inexpensive addition to the conventional machine, which eliminates the agglomeration of the forage in the bin around the conveyor, thus contributing to continuous, trouble-free operation. This and other particular advantages of the invention will be readily understood from the description of the invention shown in the appended drawings, in which:

FIGURE 1 is a side elevation, partially cut away, of the forage blower comprising a preferred embodiment of the invention, FIGURE 2 is a perspective view, partially cut away, of the details of the invention, and FIGURE 3 is a perspective view, partially in phantom and cut away, of the details of the invention, enlarged as compared to FIGURE 2.

Referring first to FIGURE 1, the apparatus of the invention includes a blower housing 10 having an impeller 11 rotatably mounted therein. A discharge boot 12 is faired into housing 10, through which the material is discharged by the impeller. The exact position of boot 12 may be controlled by an adjusting screw and associated linkages 13.

A bin A is mounted on one side of housing 10, and includes top and rear plates or walls 16 and 17, inclined bottom wall elements 18 and 19, and remote side wall 20. The adjacent side wall 25 of housing 10 has an opening B (FIGURE 2) cut therein, through which forage from bin A is discharged into the housing. Top wall 16 and bottom wall 19 have bent terminal portions 21 and 22 (FIGURE 2) for added strength.

The entire unit is mounted on a supporting frame and associated wheels 26 and 27, by means of which it readily may be moved about.

Inside bin A, near the bottom thereof, a conveyor is mounted, shown here as an auger 30, for conveying forage from the bin into blower housing 10. Auger 30 is mounted on a shaft 31, which together with impeller 11 is conventionally driven.

A second conveyor, shown in FIGURE 1 as a shake pan 35, is mounted in the open end of bin A, upon which forage to be bloom may be deposited for conveying into the bin and against auger 30. Shaker pan 35 is conventionally driven by a linkage including pitman 36 and rocker arm 37. Bin A also includes a wall element 40 opposite wall 20, which is fixed to blower housing wall 25, and to element 19 by a flange 41.

The apparatus thus far described is conventional, and need not be illustrated in greater detail. It should be noted that the driven elements, impeller 11, auger 30 and shaker pan 35, may be actuated by a common source of power, such as a tractor, electric motor or the like.

Referring also to FIGURE 3, the apparatus of the present invention includes also a baffle plate 45, of very particular conformation and position, mounted within bin A adjacent auger 30. Plate 45 has an angled upper edge 46, by which it is welded or otherwise attached to bin rear wall 17, from which it is inclined downwardly forwardly to bin floor plate 18, to which it is attached by angled lower edge 47. The right hand edge 50 (as seen in FIGURES 2 and 3) of plate 45, adjacent housing 10, is cut to be inclined downwardly outwardly with respect to the housing. Thus, the upper end of the edge 50 of plate 45 terminates adjacent housing wall 25, while the lower end of edge 50 is spaced substantially distant from wall 25. Similarly, the upper end of edge 50 is quite immediate opening B, while the lower end is spaced therefrom.

It will be seen that baffle plate 45, together with bin walls 20, 17 and 18, forms a pocket or chamber C (FIGURE 1), which by virtue of the inclination of edge 50 opens up toward opening B.

The rapid rotation of impeller 11 creates a considerable air movement, resulting in a partial vacuum inside housing 10 which tends to suck into the housing forage situate in bin A. Regardless of this force, and the propelling action of auger 30, in conventional machines, as previously noted, a tendency exists for agglomeration of forage in the bin around the auger.

For reasons not clearly comprehended, the addition of baffle plate 45 substantially eliminates this tendency, and the resulting problems. By substituting a glass plate for a portion of wall 17, and then studying the apparatus in action, it has been ascertained that a significant circular flow or vortex of air is induced in pocket C. While periodically there is a small build-up of forage in pocket C, the combined volume, speed and direction of air flow is such to automatically and repetitively clear the pocket before it fills with and is jammed with forage. Of particular significance is the fact that the presence of pocket C, created by plate 45, substantially completely eliminates the tendency of the forage to agglomerate about auger 30.

In summary, it appears that plate 45 is a substitute for or pseudo-rear wall 17, which provides a pocket or chamber C in which the natural agglomeration of forage may tend to occur, but also producing inside pocket C a flow of air which prevents formation of an agglomeration of interfering type or magnitude. Although, as stated the precise theory underlying this result cannot be detailed, the result is clear, unmistakable and important.

It has further been observed that the favorable result decreases in magnitude if the floor of bin A, comprising the region of conjunction of wall elements 18 and 19, is at the same level as the lowermost part of the periphery of housing 10. Specifically, referring to FIGURES 1 and 3, the effect described is much greater if plates 18 and 19 meet housing wall 25 significantly above lowermost point D of housing 10. Also the effect is greatly reduced if the lower end of edge 50 of plate 45 is not spaced from opening B.

Having now described the invention in preferred form, it is to be understood that the scope thereof is to be limited only in accordance with the appended claims. While the invention has been described as a forage blower, obviously it would have equal utility in handling other similar materials, for example, insulation. Consequently it is specifically to be understood that the term "forage" used herein is intended to include such similar materials.

I claim:

1. In a forage blower, a blower housing of substantially cylindrical shape, a receiving bin attached to one side of said blower housing, said bin including a rear wall and a floor at a substantial angle to the rear wall, the bin floor being mounted adjacent to and slightly above the lower periphery of said blower housing, an opening in said one side of said blower housing below the center thereof to permit feeding of forage thereinto from said bin, an impeller rotatably mounted within said blower housing for rotation at its lower extremities from front to rear of the forage blower, a conveyor in the lower portion of said bin to feed forage from the bin into said blower housing, and a baffle plate mounted in said bin adjacent that side of said conveyor which is toward the rear of the forage blower, said baffle plate being connected to the rear wall of the bin intermediate its top and bottom edges and inclined downwardly forwardly to the floor of said bin between the rear wall and the conveyor, the edge of said baffle plate adjacent said blower housing being inclined downwardly outwardly with respect to said housing, said baffle plate with the bin rear wall and floor forming a chamber having an opening into the bin at least by virtue of said downward outward inclination of an edge of the baffle plate.

2. A forage blower according to claim 1, in which said conveyor is an auger.

3. In a forage blower, a blower housing of substantially cylindrical shape, a receiving bin attached to one side of said blower housing, said bin including a rear wall and a floor at a substantial angle to the rear wall, an opening in said one side of said blower housing below the center thereof to permit feeding of forage thereinto from said bin, an impeller rotatably mounted within said blower housing for rotation at its lower extremities from front to rear of the forage blower, a conveyor in the lower portion of said bin to feed forage from the bin into said blower housing, and a baffle plate mounted in said bin adjacent that side of said conveyor which is toward the rear of the forage blower, said baffle plate being connected to the rear wall of the bin intermediate its top and bottom edges and inclined downwardly forwardly to the floor of said bin between the rear wall and the conveyor, said baffle plate at the lower edge adjacent said blower housing being spaced substantially from the housing, the baffle plate with the bin rear wall and floor forming a chamber having an opening into the bin at least by virtue of said spacing of the lower edge of the baffle plate from the housing.

4. A forage blower according to claim 3, in which said conveyor is an auger.

5. In a forage blower, a blower housing of substantially cylindrical shape, a receiving bin attached to one side of said blower housing, said bin having rear, floor and remote side walls, a wall of the housing providing the opposed side wall for the bin, the bin floor being mounted adjacent to and slightly above the lower periphery of said blower housing, an opening in said one side of said blower housing wall below the center thereof to permit feeding of forage thereinto from said bin, an impeller rotatably mounted within said blower housing for rotation at its lower extremities from front to rear of the forage blower, a conveyor in the lower portion of said bin to feed forage from the bin into said blower housing, and a baffle plate mounted in said bin adjacent that side of said conveyor which is toward the rear of the forage blower, said baffle plate being connected to the rear wall of the bin intermediate its top and bottom edges and inclined downwardly forwardly to the floor of said bin between the rear wall and the conveyor, the edge of said baffle plate adjacent said blower housing being inclined downwardly outwardly with respect to said housing, said baffle plate with the bin rear wall and floor forming a chamber having an opening into the bin at least by virtue of said downward outward inclination of an edge of the baffle plate.

6. A forage blower according to claim 5, in which said conveyor is an auger.

7. In a forage blower, a blower housing of substantially cylindrical shape, a receiving bin attached to one side of said blower housing, said bin having rear, floor and remote side walls, a wall of the housing providing the opposed side wall for the bin, an opening in said one side of said blower housing wall below the center thereof to permit feeding of forage thereinto from said bin, an impeller rotatably mounted within said blower housing for rotation at its lower extremities from front to rear of the forage blower, a conveyor in the lower portion of said bin to feed forage from the bin into said blower housing, and a baffle plate mounted in said bin adjacent that side of said conveyor which is toward the rear of the forage blower, said baffle plate being connected to the rear wall of the bin intermediate its top and bottom edges and inclined downwardly forwardly to the floor of said bin between the rear wall and the conveyor, said baffle plate at the lower edge adjacent said blower housing being spaced substantially from the housing, the baffle plate with the bin rear wall and floor forming a chamber having an opening into the bin at least by virtue of said spacing of the lower edge of the baffle plate from the housing.

8. A forage blower according to claim 7, in which said conveyor is an auger.

References Cited in the file of this patent

UNITED STATES PATENTS

| | | |
|---|---|---|
| 2,695,816 | McClellan | Nov. 30, 1954 |
| 2,739,846 | Jacobson | Mar. 27, 1956 |